(12) United States Patent
Sethumadhavan et al.

(10) Patent No.: US 9,344,779 B2
(45) Date of Patent: May 17, 2016

(54) METHOD AND APPARATUS FOR SPACE-DIVISION MULTIPLEXING SYSTEMS

(75) Inventors: Chandrasekhar Sethumadhavan, Matawan, NJ (US); Xiang Liu, Marlboro, NJ (US); Peter J. Winzer, Aberdeen, NJ (US); Alan H. Gnauck, Middletown, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 475 days.

(21) Appl. No.: 13/602,722

(22) Filed: Sep. 4, 2012

(65) Prior Publication Data

US 2013/0236175 A1    Sep. 12, 2013

Related U.S. Application Data

(60) Provisional application No. 61/530,929, filed on Sep. 2, 2011.

(51) Int. Cl.
*G02B 6/036* (2006.01)
*H04Q 11/00* (2006.01)
(Continued)

(52) U.S. Cl.
CPC .............. *H04Q 11/0003* (2013.01); *G02B 6/26* (2013.01); *G02B 6/29383* (2013.01);
(Continued)

(58) Field of Classification Search
CPC . H04J 14/0209; H04J 14/021; H04J 14/0212; G02B 6/29383; G02B 2006/02042
See application file for complete search history.

(56) References Cited

U.S. PATENT DOCUMENTS 5,937,115 A * 8/1999 Domash .......................... 385/16
6,198,569 B1 * 3/2001 Lawrence et al. ............. 359/333
(Continued)

FOREIGN PATENT DOCUMENTS

EP      1396742 A2    3/2004
EP      1396742 A3    3/2004
(Continued)

OTHER PUBLICATIONS

Sethumadhavan Chandrasekhar et al "WDM/SDM transmission of 10×128-Gb/s PDM-QPSK over 2688-km 7-core fiber with a per-fiber net aggregate spectral-efficiency distance product of 40,320 km.b/s/Hz" —Jan. 16, 2012/ vol. 20, No. 2—Optics Express 706—6 pages.
(Continued)

*Primary Examiner* — Rhonda Peace
(74) *Attorney, Agent, or Firm* — Andrew R. Ralston

(57) ABSTRACT

A space division multiplexed (SDM) transmission system that includes at least two segments of transmission media in which a spatial assignment of the two segments is different is provided. For example, the SDM transmission may include a first segment of transmission media having a first spatial assignment and a second segment of transmission media having a second spatial assignment, wherein the first spatial assignment differs from the second spatial assignment. An example method obtains an optical signal on a first segment of transmission media having a first spatial assignment and forwards the optical signal on a second segment of transmission media with a different spatial assignment. The transmission media may be a multi-core fiber (MCF), a multi-mode fiber (MMF), a few-mode fiber (FMF), or a ribbon cable comprising nominally uncoupled single-mode fiber (SMF).

23 Claims, 1 Drawing Sheet

(51) Int. Cl.
*G02B 6/293* (2006.01)
*H04J 14/04* (2006.01)
*H04J 14/00* (2006.01)
*H04J 14/02* (2006.01)
*G02B 6/26* (2006.01)
*G02B 6/02* (2006.01)

(52) U.S. Cl.
CPC ............... *H04J 14/00* (2013.01); *H04J 14/02* (2013.01); *H04J 14/021* (2013.01); *H04J 14/04* (2013.01); *G02B 6/02042* (2013.01); *H04J 14/0212* (2013.01)

(56) References Cited

U.S. PATENT DOCUMENTS

| | | | |
|---|---|---|---|
| 6,418,256 | B1 | 7/2002 | Danziger et al. |
| 6,538,783 | B1* | 3/2003 | Stephens .................... 398/82 |
| 6,724,953 | B2* | 4/2004 | Asahi ........................ 385/17 |
| 6,934,473 | B2* | 8/2005 | Stephens .................... 398/83 |
| 7,928,801 | B1* | 4/2011 | Lam et al. .................. 330/124 R |
| 8,320,769 | B2* | 11/2012 | Essiambre et al. ............ 398/143 |
| 8,335,421 | B2* | 12/2012 | Imamura ...................... 385/125 |
| 8,355,638 | B2* | 1/2013 | Essiambre et al. ............ 398/208 |
| 8,503,845 | B2* | 8/2013 | Winzer et al. ................. 385/123 |
| 8,705,913 | B2* | 4/2014 | Winzer et al. ................. 385/28 |
| 8,755,659 | B2* | 6/2014 | Imamura ...................... 385/125 |
| 8,811,787 | B2* | 8/2014 | Feuer ........................... 385/126 |
| 8,855,494 | B2* | 10/2014 | Wellrock .............. H04J 14/02 398/101 |
| 8,873,950 | B2* | 10/2014 | Akasaka ..................... 398/34 |
| 8,891,964 | B2* | 11/2014 | Cvijetic et al. ................. 398/45 |
| 8,977,121 | B2* | 3/2015 | Djordjevic ............ H04B 10/25 398/43 |
| 2002/0101636 | A1* | 8/2002 | Xiao et al. ..................... 359/127 |
| 2003/0174935 | A1* | 9/2003 | Miller et al. ................... 385/24 |
| 2005/0117836 | A1* | 6/2005 | Franson et al. ................. 385/15 |
| 2009/0324242 | A1* | 12/2009 | Imamura ...................... 398/142 |
| 2010/0054742 | A1* | 3/2010 | Imamura ...................... 398/79 |
| 2010/0061727 | A1* | 3/2010 | Colbourne et al. ............. 398/48 |
| 2010/0329670 | A1* | 12/2010 | Essiambre et al. ............. 398/43 |
| 2010/0329671 | A1* | 12/2010 | Essiambre et al. ............. 398/44 |
| 2011/0002697 | A1* | 1/2011 | Cai ............................. 398/183 |
| 2011/0052196 | A1* | 3/2011 | Gnauck et al. ................. 398/79 |
| 2012/0177365 | A1* | 7/2012 | Winzer ........................ 398/26 |
| 2012/0183304 | A1* | 7/2012 | Winzer et al. ................. 398/142 |
| 2012/0207470 | A1* | 8/2012 | Djordjevic et al. ............. 398/44 |
| 2012/0224807 | A1* | 9/2012 | Winzer et al. ................... 385/28 |
| 2012/0251126 | A1* | 10/2012 | Winzer et al. ................. 398/141 |
| 2012/0294607 | A1* | 11/2012 | Winzer et al. ................... 398/28 |
| 2013/0209106 | A1* | 8/2013 | Mukasa ......................... 398/79 |
| 2013/0236175 | A1* | 9/2013 | Sethumadhavan et al. ..... 398/55 |
| 2014/0079353 | A1* | 3/2014 | Fontaine et al. ............... 385/14 |
| 2014/0140694 | A1* | 5/2014 | Zhou et al. .................... 398/44 |

FOREIGN PATENT DOCUMENTS

JP          10197739 A1       7/1998
WO  PCT/US2012/053663    10/2012

OTHER PUBLICATIONS

Sakaghuchi et al "109-Tb/s (7×97×712-Gb/s SDM/WDM/PDM) QPSK transmission through 16.8-km homogeneous multi-core fiber" OSA/OFC/NFOEC 2011—3 pages.

Zhu et al "Space-, Wavelength-, Polarization—Division Multiplexed Transmission of 56-Tb/s over a 76.8-km Seven-Core Fiber" OSA/OFC/NFOEC 2011—3 pages.

Zhu et al. Seven-core Multicore Fiber Transmissions for passive Optical Network—May 24, 2010, vol. 18, No. 11—Optics Express—6 pages.

Robert Tkach "Scaling Optical Communications for the Next Decade and Beyond" Bell Labs Technical Journal 14 (4), 3-10 (2010) 7 Pages.

Zhu et al —"112-TB/s Space-division multiplexed DWDM transmission with 14-b/s/Hz Aggregate Spectral Efficiency over a 76.8-km seven-core fiber" Aug. 15, 2011—vol. 19, No. 17—Optics Expres—7 pages.

Savory " Digital Coherent Optical Receivers: Algorithms and Subsystems" IEEE Journal of Selected Topics in Quantum Electronics, vol. 16, No. 5, Sep./Oct. 2010—16 pages.

Vitesse "Making Next-Generation Networks a Reality" Enchanced FEC for 40G/100G—OFC-NFOEC, Mar. 2010—11 Pages.

Al Amin a et al: "Spatial Mode Division Multiplexing for Overcoming Capacity Barrier of Optical Fibers". Optoelectronics and Communications Conference (OECC), 2011 16th, IEEE, Jul. 4, 2011—pp. 415-416.

* cited by examiner

METHOD AND APPARATUS FOR SPACE-DIVISION MULTIPLEXING SYSTEMS

CROSS-REFERENCE TO RELATED APPLICATIONS

This application claims priority from U.S. Provisional Patent Application No. 61/530,929, filed on Sep. 2, 2011, entitled "Method and Apparatus for Space-Division Multiplexing Systems," which is incorporated herein by reference in its entirety.

BACKGROUND

1. Field

The invention relates to optical communication equipment and, more specifically but not exclusively, to transmission of optical communication signals in space-division multiplexing (SDM) systems using multi-core fiber (MCF), multi-mode fiber (MMF), few-mode fiber (FMF), or ribbon cable made of nominally uncoupled single-mode fiber (SMF) as the transmission media.

2. Description of the Related Art

This section introduces aspects that may help facilitate a better understanding of the invention(s) described herein. Accordingly, the statements of this section are to be read in this light and are not to be understood as admissions about what is in the prior art or what is not in the prior art.

Performance variations among signals traveling through transmission media impair the transmission performance of systems, including for example the transmission performance of space-division multiplexing (SDM) systems. Thus, one technical problem related to such transmission systems is how to increase the transmission performance of SDM systems using multi-core fiber (MCF), multi-mode fiber (MMF), few-mode fiber (FMF), or ribbon cable made of nominally uncoupled single-mode fiber (SMF) as the transmission media. In particular, the performance variations among the signals traveling through the multiple cores of a MCF, or multiple modes of a MMF, or multiple fibers of a ribbon cable need to be minimized in order to improve transmission performance.

One existing solution to address transmission performance of such transmission systems is to increase the uniformity of the transmission characteristics of the MCF, such as loss, dispersion, and crosstalk, through better and improved fiber design and manufacturing. However, this approach has limited performance benefits and becomes increasingly expensive as the uniformity requirement is increased. Further, for MMF, higher-order modes generally have higher loss than the fundamental mode, and it is difficult to make the losses of different modes equal.

SUMMARY

According to one embodiment of a MCF-based transmission system, the optical signals traveling through each of the cores of a MCF span are moved to another core in the next MCF span. This core-to-core signal rotation may be continued at multiple locations along a MCF transmission link. The locations where the core-to-core rotation is applied can be (1) optical add/drop multiplexer (OADM) sites, (2) optical amplifier sites, or (3) the combination of (1) and (2). By doing the core-to-core rotation, the uniformity in loss, dispersion, and signal arrival time can be much improved, thereby increasing the overall system performance. As it is likely that one or more cores or modes will have increased crosstalk relative to the others, embodiments of the described technique can help reduce the performance variation of spatially multiplexed signals by distributing the crosstalk penalty among all of the spatially multiplexed signals. In addition, the system degradation resulting from some optical component defects, such as the loss ripple and polarization-dependent loss (PDL) in OADMs and optical amplifiers, can be reduced through the "averaging" effect of the core-to-core rotation.

For MMF, different modes generally have different transmission characteristics. For future-generation tightly-packed ribbon cable, it is likely that different strands have different properties, depending on where the individual strand is located within the ribbon in the cable cross-section. Accordingly, the base idea of core-to-core rotation described above can be straightforwardly extended to MMF-based and fiber-ribbon-based transmission systems by using mode-to-mode signal rotation and fiber-to-fiber rotation, respectively, rather than the core-to-core rotation used in the MCF case. Note that these three variants of rotation can be used together in systems where MCF, MMF, and fiber ribbon are used in combination.

BRIEF DESCRIPTION OF THE DRAWINGS

Example embodiments will be more clearly understood from the following detailed description taken in conjunction with the accompanying drawings. The Figures represent non-limiting, example embodiments as described herein.

DETAILED DESCRIPTION

Figure 1:
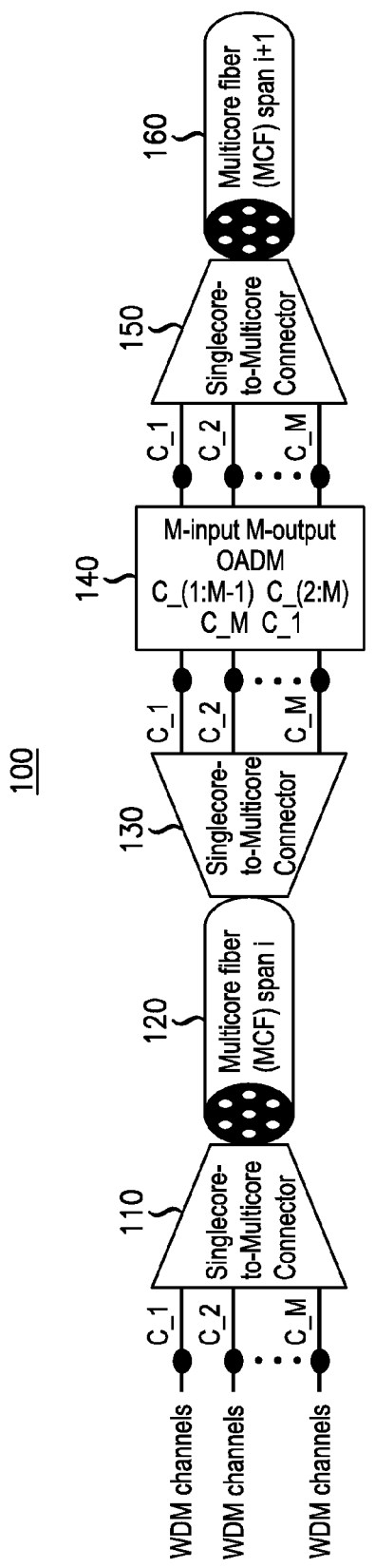
FIG. 1 shows a block diagram of a first embodiment of a space division multiplexed (SDM) transmission system according to an embodiment of the invention.

FIG. 1 shows a block diagram of a first embodiment of a space division multiplexed (SDM) transmission system according to an embodiment of the invention. FIG. 1 illustrates a first embodiment for core-to-core signal rotation in multi-core fiber (MCF) transmission for a SDM transmission system 100. The optical signals traveling through a MCF span are rearranged such that they travel through the next MCF span on different cores of the MCF. As shown, wavelength-division multiplexed (WDM) channels ($C\_1, C\_2, \ldots C\_M$) may be provided to a singlecore-to-multicore-connector 110 for connection to a first MCF span 120. (A fiber span may also be called a fiber segment.) The channels are provided to the first MFC span with a first spatial assignment. Naturally, the optical signal or channels need not utilize wavelength-division multiplexing.

The MCF span 120 is traversed by the optical signals and provided to a singlecore-to-multicore-connector 130. At this point, the spatial assignment remains unchanged. The singlecore-to-multicore-connector 130 provides the WDM channels to Optical Add Drop Multiplexer (OADM) 140. Rearrangement of the spatial assignment of the WDM channels can be easily performed in an M-input M-output OADM by connecting the output ports of the OADM to the input ports of the next singlecore-to-multi-core connector 150 with a cyclic core index shift, M being an integer. For example, $C\_(1:M-1) \rightarrow C\_(2:M)$; $C\_(M) \rightarrow C\_1$. That is; the spatial assignment for the first to the M−1th channel of a first fiber segment is switched to the next higher channel in the next fiber segment, and spatial assignment of the M-th channel in the first fiber segment is shifted to the first channel in the next fiber channel. In another embodiment, the spatial assignment may change according to a predetermined pattern. The M×M OADM can be in the form of an M×M wavelength selective switch. The OADM may also be a Reconfigurable OADM, nominally a ROADM.

Figure 2:
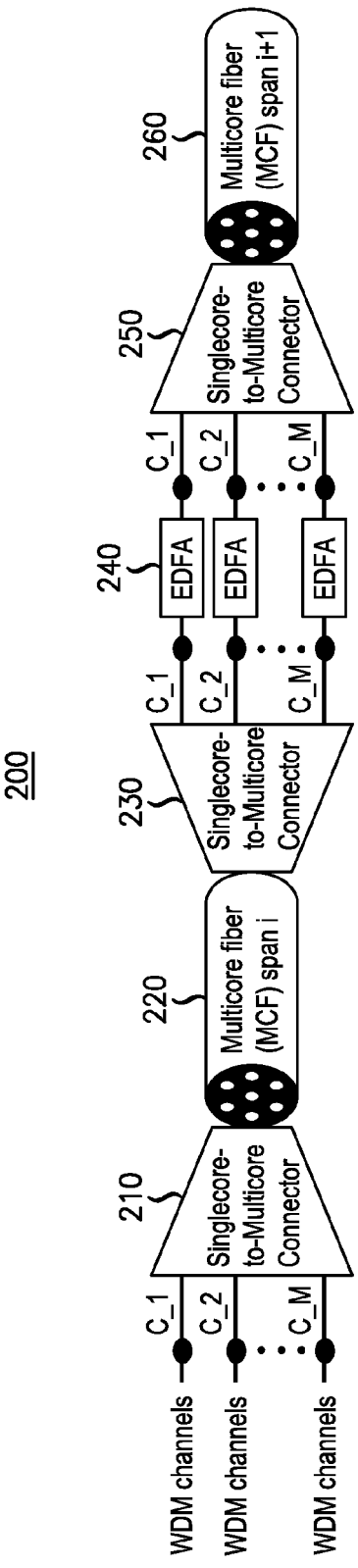
FIG. 2 shows a block diagram of a second embodiment of a space division multiplexed (SDM) transmission system according to an embodiment of the invention.

FIG. 2 shows a block diagram of a second embodiment of a space division multiplexed (SDM) transmission system according to an embodiment of the invention. FIG. 2 illustrates a second embodiment in which the core-to-core signal rotation is realized by suitably arranging the connections between the outputs of optical amplifiers and the input ports of the singlecore-to-multicore connector.

In the illustrated SDM transmission system 200, optical signals traveling through a MCF span are rearranged such that they travel through the next MCF span on different cores of the MCF. As shown, wavelength-division multiplexed (WDM) channels ($C\_1, C\_2, \ldots C\_M$) may be provided to a singlecore-to-multicore-connector 110 for connection to a first MCF segment 220. The channels are provided to the first MFC span with a first spatial assignment. Naturally, the optical signal or channels need not utilize wavelength-division multiplexing.

The MCF span 220 is traversed by the optical signals and provided to a singlecore-to-multicore-connector 230. At this point, the spatial assignment remains unchanged. The singlecore-to-multicore-connector 230 provides the WDM channels to a plurality of fiber amplifiers 240. In one embodiment, the fiber amplifiers are erbium doped fiber amplifier (EDFA). Rearrangement of the spatial assignment of the WDM channels can be easily performed by suitably arranging the connections between the outputs of optical amplifiers 240 and the input ports of the singlecore-to-multicore connector connector 250. For example, the spatial assignment between fiber segments can be altered so as to be varied according to a cyclic core index shift or some other predetermined pattern.

Note that a long MCF can usually be made out the same preform design, so the core-to-core non-uniformity in loss and dispersion could be similar from span to span. Rotating the signals through different cores along a MCF fiber effectively reduces the negative system impact of the core-to-care non-uniformity. Note also that the core-to-core signal rotation may reduce the arrival time difference among signals that originate from the same location and terminate at the same destination. This may be beneficial for some applications.

In other embodiments according to the principles of the invention, the transmission media of the SDM transmission system may a multi-mode fiber (MMF), a few-mode fiber (FMF), or a ribbon cable made of nominally uncoupled single-mode fiber (SMF). For a MMF-based transmission system, the single-core-to-multicore connectors shown in FIGS. 1 and 2 will be replaced with mode-splitters. Note also that the core-to-core rotation (mode-to-mode) for MCF (FMF) can be implemented on a "sub-span" basis, e.g., implemented when splicing short fiber segments together to form a long MCF (FMF) fiber span.

One or more embodiments described herein may help increase the overall performance of multi-core-fiber (MCF) and few-mode-fiber (FMF) based transmission systems, which is of value in future optical transmission systems that utilize MCF and FMF as the transmission media to support high transmission capacity.

In one embodiment, a space division multiplexed (SDM) transmission system comprises at least two segments of transmission media, wherein a spatial assignment of the two segments is different. In one embodiment, a space division multiplexed (SDM) transmission system comprises a first segment of transmission media having a first spatial assignment; and a second segment of transmission media having a second spatial assignment; wherein the first spatial assignment differs from the second spatial assignment.

In one embodiment, at least one respective segment of the transmission media of the SDM transmission system is a multi-core fiber (MCF), a multi-mode fiber (MMF), a few-mode fiber (FMF), or a ribbon cable made of nominally uncoupled single-mode fiber (SMF).

In one embodiment, the second spatial assignment is a rotated version of the first spatial assignment. In one embodiment, the second spatial assignment varies from the first spatial assignment according to the predetermined pattern.

In one embodiment, fiber cores of the second segment are connected to fiber cores of the first segment, a first fiber core of the first segment being connected to other than a first fiber core of the second segment. Thus, a first fiber core of the first segment is connected to a fiber of the second segment other than a corresponding first fiber core of the second segment. In one embodiment, spatial modes of the second segment are connected to spatial modes of the first segment, a first spatial mode of the first segment being connected to other than a first spatial mode of the second segment. Thus, a first spatial mode of the first segment is connected to a spatial mode of the second segment other than a corresponding first spatial mode of the second segment. In one embodiment, fibers of the second segment are connected to fibers of the first segment, a first fiber of the first segment being connected to other than a first fiber of the second segment. Thus, the optical signals traveling a first core of the first segment are moved to a core of the second segment other than a corresponding first core of the second segment.

In one embodiment, the spatial assignment is changed between the first segment and the second segment by an optical add drop multiplexer (OADM). The (OADM) may be a reconfigurable optical add drop multiplexer (ROADM). In another embodiment, the optical add drop multiplexer contains an N-input N-output optical switch.

In one embodiment, the spatial assignment is changed between the first segment and the second segment by a fiber amplifier. In another embodiment, the fiber amplifier is an N-input N-output an Erbium doped fiber amplifier.

In one embodiment, the SDM transmission system includes a transmitter and a receiver, and the first segment and the second segment comprise a link between the transmitter and the receiver. In another embodiment, the SDM transmission system includes a first optical add drop multiplexer (OADM) and a second OADM, and the first segment and the second segment comprise a link between the first OADM and the second OADM. In yet another embodiment, the SDM transmission system includes a first amplifier and a second amplifier, wherein the first segment and the second segment comprise a link between the first amplifier and the second amplifier.

In one embodiment, a method comprises obtaining optical signal on a first segment of transmission media having a first spatial assignment, and forwarding the optical signal on a second segment of transmission media having a different spatial assignment thereby altering the spatial assignment of the optical signal.

In one embodiment, the transmission media is a multi-core fiber (MCF), a multi-mode fiber (MMF), a few-mode fiber (FMF), or a ribbon cable made of nominally uncoupled single-mode fiber (SMF). In one embodiment, the transmission media is a multi-core fiber (MCF) and the forwarding comprises moving the optical signals traveling a first core of the first segment to a core other than the first core of the second segment. In another embodiment, the optical signals traveling a first core of the first segment are moved to a core of the second segment other than a corresponding first core of the second segment.

In one embodiment, the transmission media is a multi-mode fiber (MMF) or a few-mode fiber (FMF) and the forwarding comprises moving the optical signals traveling a first mode of the first segment to a mode other than the first mode of the second segment. In another embodiment, the optical signals traveling a first mode of the first segment are moved to a mode of the second segment other than a corresponding first mode of the second segment.

In one embodiment, the transmission media is a ribbon cable comprising nominally uncoupled single-mode fiber (SMF) and the forwarding comprises moving the optical signals traveling a first single mode fiber of the first segment to a single mode fiber other than the first single mode fiber of the second segment. In another embodiment, the optical signals traveling a first single mode fiber of the first segment are moved to a single mode fiber of the second segment other than a corresponding first single mode fiber of the second segment.

In one embodiment, the altering of the spatial assignment of the optical signal occurs at an optical add/drop multiplexer (OADM) site, reconfigurable add/drop multiplexer (ROADM) site, an optical amplifier site, a point in a fiber span, or a combination thereof.

In one embodiment, the obtaining and forwarding are performed at multiple locations along a transmission link, whereby spatial assignment alteration is performed at multiple locations along a transmission link. The spatial assignment alternation may be performed in a cyclic fashion or according to a predetermined pattern.

In one embodiment, the first segment and the second segment comprise a link between a transmitter and a receiver. In one embodiment, the first segment and the second segment comprise a link between two optical add drop multiplexers (OADMs). In one embodiment, the first segment and the second segment comprise a link between two amplifiers Various provided embodiments offer a novel, different approach, a system-level approach, to addressing the performance variations among the signals traveling through the multiple cores of a MCF as compared to the existing conventional approaches based on generating better (improved) fiber design and manufacturing. As a result, the embodiments provided herein may improve system performance with essentially no additional cost.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors" and "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

What is claimed is:

1. A space division multiplexed (SDM) transmission system comprising:
   first and second segments of multicore optical fiber;
   an optical add-drop multiplexer (OADM) configurable to add and drop wavelength channels of a wavelength-division multiplexed optical signal;
   a first singlecore-to-multicore connector configured to connect individual cores of said first segment to inputs of said OADM; and
   a second singlecore-to-multicore connector configured to connect outputs of said OADM to individual cores of said second segment, wherein a first fiber core of said first segment is connected to a fiber core of said second segment other than a fiber core corresponding to said first fiber core of said first segment.

2. The SDM transmission system of claim 1, wherein a spatial assignment of said optical cores of said second multicore optical fiber is altered from a spatial assignment of said optical cores of said first multicore optical fiber in a cyclic fashion.

3. The SDM transmission system of claim 1, wherein a spatial assignment of said optical cores of said second multicore optical fiber varies from a spatial assignment of said optical cores of said first multicore optical fiber according to a predetermined pattern.

4. The SDM transmission system of claim 1, wherein said OADM comprises a reconfigurable optical add drop multiplexer (ROADM).

5. The SDM transmission system of claim 1, wherein the optical add drop multiplexer contains an N-input N-output optical switch.

6. The SDM transmission system of claim 1, further comprising a transmitter and a receiver, wherein the first segment and the second segment comprise a link between the transmitter and the receiver.

7. The SDM transmission system of claim 1, wherein said OADM is a first OADM, and further comprising a second OADM and a third OADM, wherein the first segment and the second segment comprise a link between the second OADM and the third OADM.

8. The SDM transmission system of claim 1, further comprising a first amplifier and a second amplifier, wherein the first segment and the second segment comprise a link between the first amplifier and the second amplifier.

9. A method comprising:
obtaining an optical signal on a first multicore optical fiber segment;
forwarding the optical signal to a second multicore optical fiber segment,
wherein the optical signal is forwarded via a first singlecore-to-multicore connector that connects individual cores of said first segment to inputs of an optical add-drop multiplexer (OADM) or an optical amplifier;
wherein the optical signal is forwarded via a second singlecore-to-multicore connector that connects outputs of said OADM or said optical amplifier to individual cores of said second segment, and
wherein spatial assignment of optical cores of said first and second multicore optical fibers segments is altered such that a first fiber core of said first segment is connected to a single fiber core of said second segment other than a fiber core corresponding to said first fiber core of said first segment.

10. The method of claim 9, wherein the obtaining and forwarding are performed at multiple locations along a transmission link, and wherein spatial assignment alteration is performed at multiple locations along said transmission link.

11. The method of claim 9, wherein the spatial assignment of said optical cores of said second multicore optical fiber segments is altered from the spatial assignment of said optical cores of said first multicore optical fiber segments in a cyclic fashion.

12. The method of claim 9, wherein the spatial assignment of said optical cores of said second multicore optical fiber is altered from the spatial assignment of said optical cores of said first multicore optical fiber according to a predetermined pattern.

13. The method of claim 9, wherein said OADM comprises a reconfigurable optical add drop multiplexer (ROADM).

14. The method of claim 9, wherein said OADM comprises an N-input N-output optical switch.

15. A space division multiplexed (SDM) transmission system comprising:
a first and second of multicore optical fiber segments;
a plurality of optical amplifiers;
a first singlecore-to-multicore connector configured to connect individual cores of said first segment to individual ones of said amplifiers; and
a second singlecore-to-multicore connector configured to connect outputs of individual ones of said amplifiers to individual cores of said second segment,
wherein a first fiber core of said first segment is connected to a single fiber core of said second segment other than a fiber core corresponding to said first fiber core of said first segment.

16. The SDM transmission system of claim 15, wherein a spatial assignment of said optical cores of said second multicore optical fiber segment is altered from a spatial assignment of said optical cores of said first multicore optical fiber segment in a cyclic fashion.

17. The SDM transmission system of claim 15, wherein a spatial assignment of said optical cores of said second multicore optical fiber segment varies from a spatial assignment of said optical cores of said first multicore optical fiber segment according to a predetermined pattern.

18. The SDM transmission system of claim 15, further comprising a transmitter and a receiver, wherein the first segment and the second segment comprise a link between the transmitter and the receiver.

19. The SDM transmission system of claim 15, further comprising a second amplifier and a third amplifier, wherein the first segment and the second segment comprise a link between the second amplifier and the third amplifier.

20. A space division multiplexed (SDM) transmission system comprising:
a first multicore optical fiber having a first plurality of optical cores; and
a second multicore optical fiber having a second plurality of optical cores,
wherein a first fiber core of said first plurality of optical cores is connected to a single second fiber core of said second multicore optical fiber other than a first fiber core of said second multicore optical fiber that corresponds to said first fiber core of said first multicore optical fiber.

21. The SDM transmission system of claim 20, wherein said first and second fiber cores are connected via an optical add-drop multiplexer (OADM).

22. The SDM transmission system of claim 20, wherein said first plurality of optical cores are connected to said second plurality of optical cores according to a cyclic core index shift.

23. The SDM transmission system of claim 20, wherein said first and second fiber cores are connected via an optical amplifier.

* * * * *